United States Patent [19]

Mukae et al.

[11] 3,993,293

[45] Nov. 23, 1976

[54] AUTOMATIC LEACHING SYSTEM FOR HYDRO-METALLURGICAL PRODUCTION OF ZINC

[75] Inventors: Satoshi Mukae; Yoshitaka Shiota, both of Simonoseki, Japan

[73] Assignee: Mitsui Mining & Smelting Co., Ltd., Tokyo, Japan

[22] Filed: June 24, 1975

[21] Appl. No.: 589,844

[30] Foreign Application Priority Data
June 25, 1974 Japan.............................. 49-74748
July 9, 1974 Japan.............................. 49-78422

[52] U.S. Cl............................. 266/80; 75/101 R; 137/93; 266/81; 266/91; 266/135; 324/30 R
[51] Int. Cl.²........................................ C22B 3/02
[58] Field of Search.............. 266/8, 12, 80, 81, 90, 266/101, 135; 75/101 R, 120; 137/5, 93; 204/195 R, 195 G; 324/30 R; 134/64 R

[56] References Cited
UNITED STATES PATENTS

| | | |
|---|---|---|
| 3,355,375 | 11/1967 | Badgley.................... 324/30 R X |
| 3,552,212 | 1/1971 | Ohlin ........................ 134/64 R |
| 3,605,775 | 9/1971 | Zaander et al.................. 137/93 X |
| 3,625,850 | 12/1971 | Arrington..................... 204/195 R |
| 3,628,555 | 12/1971 | Nagano et al................. 137/93 X |
| 3,687,828 | 8/1972 | Carpenter et al................. 75/120 X |
| 3,779,265 | 12/1973 | Hart........................ 137/93 |
| 3,880,653 | 4/1975 | Hougen............................ 75/101 R |
| 3,892,652 | 7/1975 | Levine et al................... 324/30 R X |

FOREIGN PATENTS OR APPLICATIONS

| | | |
|---|---|---|
| 1,957,087 | 5/1971 | Germany .......................... 137/93 |
| 6,704,385 | 9/1968 | Netherlands..................... 324/30 R |
| 688,642 | 3/1953 | United Kingdom................. 137/93 |

*Primary Examiner*—W. Tupman
*Assistant Examiner*—Paul A. Bell

[57] ABSTRACT

An automatic leaching system for the hydrometallurgical production of zinc comprising a pH meter and means for detecting the feed rate of calcine. The pH meter is provided with means for automatically washing the electrodes thereof so as to be capable of continuously and automatically detecting the pH value of the slurry obtained by mixing a spent electrolyte with the calcine. The system comprises a feedback control circuit and a feed-forward control circuit in which the flow rate of the spent electrolyte supplied to the system is the manipulated variable, and the pH value of the slurry is the controlled variable. These control circuits are used for the pH control so that the pH value of the slurry can be maintained constant by controlling the flow rate of the spent electrolyte.

3 Claims, 7 Drawing Figures

AUTOMATIC LEACHING SYSTEM FOR HYDRO-METALLURGICAL PRODUCTION OF ZINC

BACKGROUND OF THE INVENTION

This invention relates to an automatic leaching system for the hydrometallurgical production of zinc, and more particularly to a neutral leaching section in such a system.

In a leaching system for the hydrometallurgical production of zinc, it is necessary to control the pH value of the slurry so that it can be maintained at a predetermined setting. It is very important to improve the reliability of this pH control since the effect of leaching as well as the effect of later purification is affected greatly by the effect of control of the pH value. A double continuous leaching system is commonly employed in the art. This system consists of a neutral leaching section in which calcine is leached with a solution overflowing from an acid thickener to obtain a slurry, and an acid leaching section in which a spent electrolyte is added to the slurry for further promoting the leaching reaction. However, reliable pH control is difficult to attain in the neutral leaching section due to the fact that various variable factors which should be taken into account are involved in the operation of this neutral leaching section. Especially when this pH control is carried out manually, further difficulty is encountered in attaining the desired reliable pH due to the fact that another variable factor owing to the difference in the skill of the operators is added to the variable factors above described. An example of this manual pH control is shown in FIG. 7. It will be seen from the graph of FIG. 7 that the pH value of the slurry varies greatly within the range of about 3.0 to 5.0, and thus, the reliability of the pH control is quite low. An automatic pH control has been proposed to an effort to obviate the difficulty encountered with such manual control. In this automatic control, there is such an essential requirement that the pH value must be continuously and automatically measured. However, the proposed automatic control has been defective among others in that continuous automatic measurement of the pH value cannot be attained due to a large amount of scale tending to adhere to the surface of the electrodes of the pH meter. Various devices have been proposed hitherto in an effort to remove the scale adhered to the surface of the electrodes of the pH meter. One of the prior art devices utilizes ultrasonic waves for the automatic washing of the electrodes, and another utilizes a washing brush adapted for periodic splash washing of the electrodes by water. However, these prior art devices have not been so effective in slipping down the scale resulting in incapability of reliable automatic measurement of the pH value. Thus, the prior art efforts have failed in automating the leaching process for the hydrometallurgical production of zinc.

SUMMARY OF THE INVENTION

It is a primary object of the present invention to provide an improved automatic leaching system for the hydrometallurgical production of zinc in which means are provided for automatically maintaining constant the pH value of a neutral leaching solution by adding a controlled amount of a spent electrolyte to the neutral leaching solution produced in a neutral leaching section by leaching calcine with a solution overflowing from an acidic leaching section.

In accordance with one aspect of the present invention, there is provided an automatic leaching system for the hydrometallurgical production of zinc comprising a neutral leaching section and acidic leaching section for leaching calcine with the solution overflow from the thickener of acid leaching section to obtain a slurry, wherein the improvement comprises in combination a feed-forward circuit consisting of means for detecting the feed rate of the calcine supplied to said neutral leaching section, means for detecting the flow rate of a spent electrolyte, supplied to said neutral leaching section, an electronic computer connected to said feed rate detecting means and said flow rate detecting means to make necessary computation in response to the application of the signals representative of the detected feed rate and flow rate from said detecting means thereby generating a control signal, control means connected to said computer to generate an instruction signal in response to the application of said control signal from said computer, and flow controlling valve means for regulating the flow rate of the spent electrolyte in response to the application of said instruction signal from said control means, and a feedback control circuit consisting of a pH meter for continuously detecting the pH value of the slurry after being mixed with the spent electrolyte, said computer, said control means and said flow controlling valve means, whereby the flow rate of the spent electrolyte mixed with the slurry can be controlled to automatically maintain the pH value of the slurry at a predetermined constant setting.

In accordance with another aspect of the present invention, there is provided an automatic leaching system of the above character, wherein said pH meter is provided with means for automatically washing the electrodes thereof, said automatic washing means comprising a rotatable supporting member, a fluid cylinder supported by said supporting member and carrying said electrodes at the lower end of the vertically movable piston rod thereof, a plurality of tanks including at least a measuring tank provided with an agitator, a first water washing tank, a chemical washing tank and a second water washing tank disposed in the above order beneath the moving path of said electrodes of said pH meter actuated by the vertical movement of said piston rod and the rotating movement of said supporting member, so that said electrodes of said pH meter can be immersed at first in said measuring tank, then successively in said first water washing tank, said chemical washing tank and said second water washing tank to be washed under agitation, and subsequently in said measuring tank again.

DETAILED DESCRIPTION OF THE INVENTION

An embodiment of the present invention will now be described in detail with reference to a flow sheet shown in FIG. 1.

Figure 1:
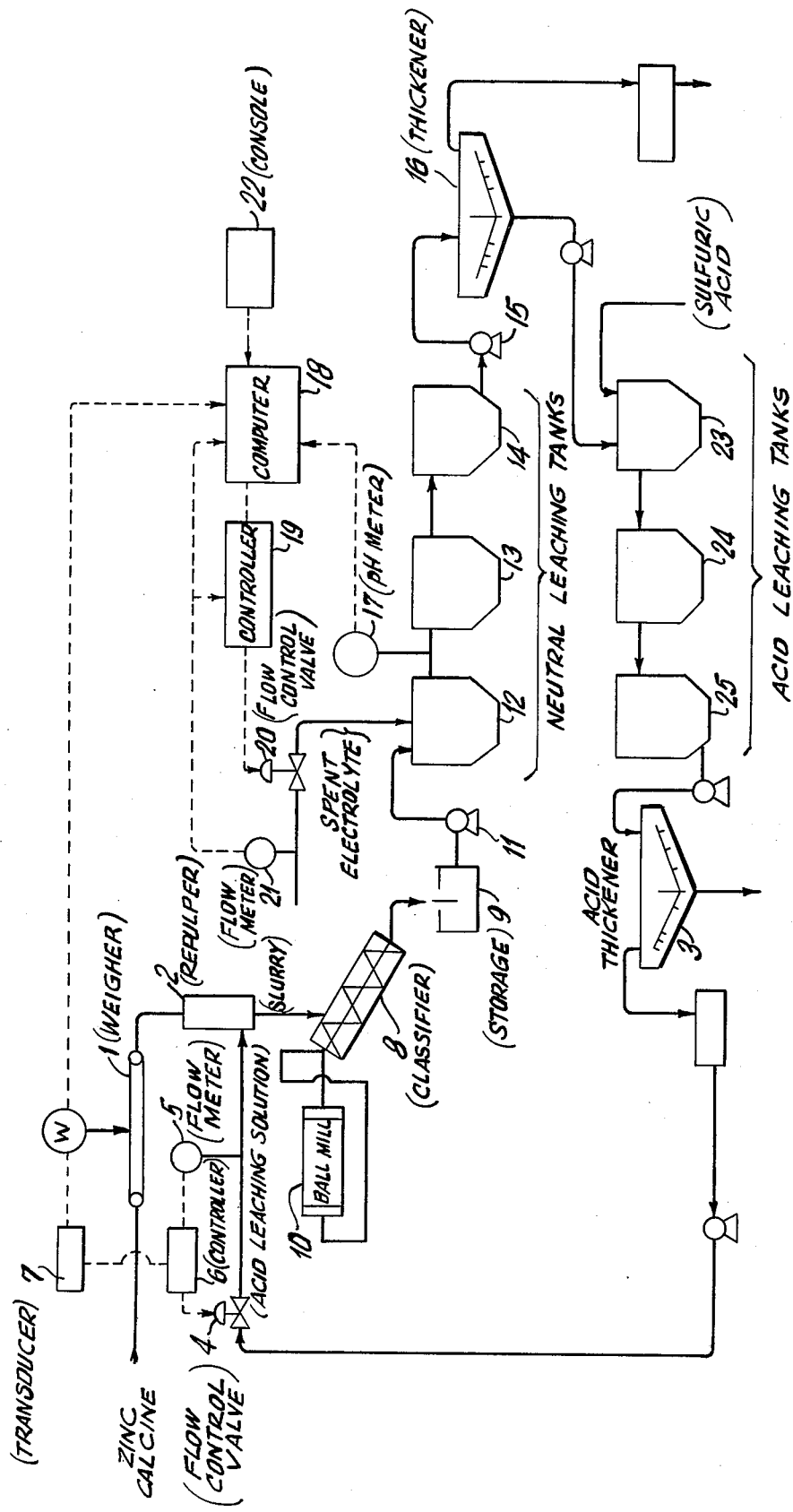
FIG. 1 is a flow sheet showing diagrammatically an imbodiment of the automatic leaching system according to the present invention.

Referring to FIG. 1, zinc calcine obtained by roasting zinc concentrate in a roasting section (not shown) is supplied to a constant feeding weigher 1. The constant feeding weigher 1 weighs the calcine and feeds continuously a constant amount of the calcine into a repulper 2. A leaching solution overflow from an acid thickener 3 in an acidic leaching section is supplied into the repulper 2 for the purpose of leaching the calcine to obtain a slurry (pulp density 200–300 g/l). A flow controlling valve 4 and a flow meter 5 are disposed in the path of the overflow supplied from the thickener 3 of the acid leaching section. The flow meter 5 detects the flow rate of this overflow to apply an electrical signal representative of the flow rate to a controller 6. The feed rate of the calcine detected by the constant weighing feeder 1 is converted into an electrical signal by a transducer 7, and this electrical signal is also applied to the controller 6. The controller 6 determines a flow rate setting proportional to the feed rate of the calcine from the constant weighing feeder 1, and an electrical signal representative of this flow rate setting is applied from the controller 6 to the flow controlling valve 4. In response to the application of this signal, the flow controlling valve 4 controls the flow rate of the overflow from the acid leaching section so that the flow rate thereof can be set to be equal to the setting. By the action of such a ratio control circuit, the ratio between the feed rate of the calcine and the flow rate of the overflow can be maintained constant, and the pH value of the slurry can be controlled in such a manner that the pH value is free from any substantial variations and is substantially constant.

The calcine and the overflow are mixed together in the repulper 2 and the mixture in the form of pulp is fed into a classifier 8 having screens (60 Taylor mesh). The pulp is classified into slurry an oversize by the classifier 8, and the slurry is fed from the classifier 8 into a storage tank 9. A ball mill 10 is connected in closed circuit form to the classifier 8, and the oversize ground to a finer size by the ball mill 10 is fed back into the classifier 8 again. The slurry is fed from the storage tank 9 into a first neutral leaching tank 12 by a pump 11. A spent electrolyte is also supplied to this first neutral leaching tank 12. The slurry is fed from the first neutral leaching tank 12 successively into a second neutral leaching tank 13 and a third neutral leaching tank 14 and is leached at about 70° C in these tanks 12, 13 and 14 by neutralization until no more leaching reaction occurs. The neutral leaching solution (zinc concentrate 135–150 g/l) thus obtained is fed from the third neutral leaching tank 14 into a thickener 16 of the neutral leaching section by a pump 15. The overflow from the thickener 16 of the neutral leaching section is supplied to a purification section, (not shown), while the underflow from the thickener 16 is supplied to the acid leaching section, which includes a fourth, fifth and sixth acid leaching tank 23, 24, 25. The sulfuric acid is also supplied to the acid leaching tank 23 for further promoting the leaching reaction. The acid leaching solution thus obtained is fed from the acid leaching tank 25 into a thickener 3 of the acid leaching section. The overflow from the thickener 3 is recircurated to the repulper 2, while the underflow the thickener 3 is fed into a belt filter.

In the leaching process above described, the pH value of the slurry tends to be variable as a matter of fact due to the factors including the acid concentration of the overflow from the acidic leaching section, grain size and grade of the calcine even when the ratio between the feed rate of the calcine and the flow rate of the overflow added thereto is maintained constant by the ratio control circuit. In order to prevent this undesirable variation in the pH value and to improve the pH control, a feedback control circuit is provided between the slurry transfer line and the spent electrolyte supply line. This feedback control circuit includes a pH meter 17 disposed in the path of slurry flow between the first and second neutral leaching tanks 12 and 13 to measure the pH value of the slurry flowing through this path thereby generating an electrical signal representative of the measured pH value, an electronic computer 18 connected to the pH meter 17 to receive the output signal of the pH meter 17, a controller 19 connected to the computer 18 to receive the information from the computer 18 thereby generating an instruction signal, and a flow controlling valve 20 disposed in the supply path of the spent electrolyte to control the flow rate of the spent electrolyte in response to the instruction signal applied from the controller 19. Detection of the pH value of the slurry by the pH meter 17 for the purpose of improving the pH control in the leaching process may be accompanied by a considerable dead time and a poor response due to the fact that the slurry consisting of the calcine and the overflow from the thickener 3 of the acid leaching section is fed from the repulper 2 to the storage tank 9 through the classifier 8, and then to the first neutral leaching tank 12 by the pump 11. Therefore, the signal representative of the feed rate of the calcine detected by the constant feeding weigher 1 is also applied to the conputer 18, and a second flow meter 21 is disposed in the supply path of the spent electrolyte to detect the flow rate of the spent electrolyte and to apply an electrical signal representative of this flow rate to the computer 18. The second flow meter 21, flow controlling valve 20, controller 19, computer 18 and constant feeding weigher 1 constitute a feed-forward circuit.

The pH meter 17 is provided with means for automatically washing the electrodes thereof so that measurement of the pH value of the slurry can be continuously and reliably carried out over an extended period of time. The automatic washing means employed in the present invention is based on the following finding:

(1) The properties and the rate of growth of scale adhering to the surface of the electrodes of the pH meter 17 differ depending on the points of measurement. (2) When the outlet of the first neutral leaching tank 12 is selected as the point of pH measurment, the scale is adhered to the surface of the electrodes of the pH meter 17 in such a large amount that continuous pH measurement over 4 hours or more is no more possible without having the scale adhered slipping down and therefore, the electrodes must be washed within the period of time of 4 hours after commencement of the pH measurement. (3) The scale referred to in (2) is generally difficult to remove mechanically as well as chemically since the amount thereof is considerably greater than when, for example, the outlet of the third neutral leaching tank 14 is selected as the point of pH measurement. However, this scale is soluble in a reducing solution such as hydrochlorichydroxyl-amine. The results of spectronanalysis of the scale adhered are shown in the Table 1.

Table 1

| As | Pb | Au | Si | Fe | Tl | Mn | Mg | Bi | Al | Ni | V |
|----|----|----|----|----|----|----|----|----|----|----|---|
| ± | ++++ | - | ++++ | ++++ | ± | +++ | ++++ | ++ | + | +++ | - |

| Cd | Ca | K | Na | Sb | Cu | Zn | Sn | Co |
|----|----|----|----|----|----|----|----|-----|
| ++ | ++ | +++ | ++++ | ± | +++++ | ++++ | ± | ± |

The structure of the automatic washing means provided for the pH meter 17 will be described in detail with reference to FIG. 2.

Figure 2:
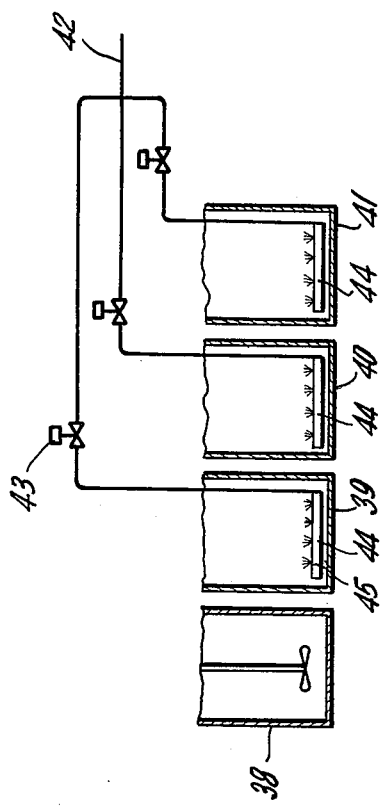
FIG. 2 is a perspective view of a pH meter provided with automatic electrode washing means.
Figure 3:
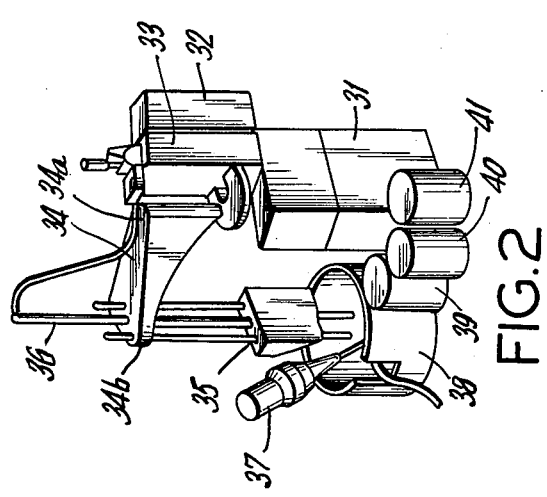
FIG. 3 is a schematic diagram showing the arrangement of agitating means provided for the pH meter shown in FIG. 2.

Referring to FIG. 2, a motor box 33 provided with a control box 32 is fixedly mounted on a base 31. A supporting member 34 is pivoted at one end 34a thereof to the motor box 33, and the piston rod of a fluid cylinder 36 extends through the other end 34b of the supporting member 34. An electrode holder 35 holding the electrodes of the pH meter 17 is fixed to the lower end of the piston rod of the fluid cylinder 36 for vertical movement therewith. A tank 38 for measuring the pH value of the slurry, and a first water washing tank 39, a chemical washing tank 40 and a second water washing tank 41 for washing the electrodes of the pH meter 17 are arranged beneath the electrode holder 35 in the above order in the direction of rotation of the supporting member 34. An agitator 37 is associated with the measuring tank 38 in order to prevent precipitation of the slurry. Further, an agitating air supplying means is provided for each of the first water washing tank 39, chemical washing tank 40 and second water washing tank 41. This agitating air supplying means includes an electromagnetic valve 43 disposed in a compressed air supply conduit 42 to be opened for a predetermined length of time to allow supply of compressed air therethrough, and a pipe 44 connected to the conduit 42 and disposed on the bottom wall of each tank. This pipe 44 is provided with a plurality of nozzles 45 for forcedly supplying a jet of compressed air into each tank. Thus, the agitating air under pressure is forcedly supplied for a predetermined length of time into the tanks 39 to 41 in which the electrodes held by the electrode holder 35 are successively immersed to be washed with the water and the chemicals. The chemicals used are a reducing solution such as a solution of hydrochloric acid and hydrochloric-hydroxyl-amine. The concentration of the hydrochloric-hydroxyl-amine ranges 190–240 gll, more preferable 215 gll. The pH meter of the kind above described which is provided with such automatic washing means may be additionally disposed as required at a point between the third neutral leaching tank 14 and the thickener 16 of the neutral leaching section, at a point between the fourth and fifth leaching tanks 23, 24 and at a point adjacent to the outlet of the sixth leaching tank 25.

The electrodes of the pH meter 17 are used for the pH measurement for a predetermined period of time and are then urged upward by the fluid cylinder 36 from within the measuring tank 38. The supporting member 34 is then rotated to bring the electrodes above the first water washing tank 39, the fluid cylinder 36 being then actuated to immerse the electrodes in the water contained in the first water washing tank 39. The electrodes adhering sludge and scale thereon are first washed with the water in the first water washing tank 39 so as to extend the service life of the chemicals contained in the chemical washing tank 40. After immersion of the electrodes in the water contained in the first water washing tank 39, agitating air under pressure is forcedly supplied into the water in this tank 39 by the agitating air supplying means, and the sludge adhered to the surface of the electrodes is washed out with water. After this water washing treatment, the electrodes are urged upward again by the fluid cylinder 36, and the supporting member 34 is rotated to bring the electrodes above the chemical washing tank 40. The electrodes are then immersed in the chemicals contained in the chemical washing tank 40, and agitating air under pressure is supplied into the chemicals by the agitating air supplying means. Subsequent to this chemical washing treatment, the electrodes are transferred from the chemical washing tank 40 into the second water washing tank 41 in the same manner to be immersed in the water contained in the second water washing tank 41. Agitating air under pressure is supplied into the water in this tank 41 for removing the chemicals from the electrodes.

The period of time required for the above operation is, for example, as follows:

Measurement in the measuring tank 38 : 2 hours → washing with water in the first water washing tank 39 : 5 minutes → washing with chemical in the chemical washing tank 40 : 20 minutes → washing with water in the second water washing tank 41 : 5 minutes.

Therefore, the total washing time is 30 minutes and the total period of time required for one measuring cycle is 2.5 hours. Needless to say, the periods of time required for the pH measurement and respective washing treatments can be suitably selected by suitably selecting the setting of a timer.

The provision of the automatic washing device adapted for carrying out automatic washing of the electrodes with the chemicals at intervals of 2.5 hours in the manner above described is advantageous in that the pH value at the outlet of the first neutral leaching tank 12 can be continuously and reliably measured over about 1 week in contradistinction to the prior art system in which such continuous measurement could only be possible over a period of time of the order of 4 hours at the most. Therefore, maintenance at intervals of the order of one week is only required to ensure continuous and reliable pH measurement over an extended length of time.

Figure 4:
FIG. 4 is graph showing the result of measurement of the pH value by the pH meter.

Referring to FIG. 4, the curve $a$ represents the flow rate of the spent electrolyte, and the curve $b$ represents the pH value of the slurry in the first neutral leaching tank 12. In the graph, the numerals indicate the elapsed length of time in hours of automatic measurement after manual maintenance, and the period of time between 8 hours and 128 hours and between 136 hours and next automatic measurement are omitted in the graph. The numerals 0, 2, 4, . . . appearing after the numeral 136 mean that automatic measurement was started again after 136 hours and the manual maintenance was carried out at that time.

It will be seen from the graph that the waveform representing the pH value is substantially rectangular indicating that the pH meter makes a sharp response due to the effect of washing carried out at intervals of 2.5 hours. Such a waveform lasts for about 120 hours, and this indicates that the pH value can be continuously and reliably measured over an extended period of time when the electrodes of the pH meter are washed at intervals of about 2.5 hours by the automatic washing device above described. Measurement over a long period of time of the order of 140 hours results in a gradual change of the rectangular waveform into a sawtooth-like, waveform, and pH variations of small degree are not recorded although pH variations of large degree can be recorded. This indicates reductions of the sensitivity of the pH meter. A rectangular waveform similar to that above described can be obtained again and the sensitivity of the pH meter can be restored when the chemicals is renewed at that time and washing by the automatic washing device is started at intervals of 2.5 hours again.

In a strict sense, the pH curve is not given by a linear function since, in the control system above described. However, the pH value of the slurry is controlled to lie substantially within the range of 3.0 and 4.0 in the calcine leaching process.

This pH curve can be considered to be approximated by a straight line.

According to the present invention, the pH value is controlled on the basis of an equation which is given by $$Y_3 = Y_1 + Y_2 \qquad (1)$$

where
$Y_3$: setting of spent electrolyte in $m^3$/hour
$Y_1$ : amount of spent electrolyte proportional to amount of calcine in $m^3$/hour
$Y_2$: amount of spent electrolyte required for compensating for deviation of pH value in $m^3$/hour.

The amount $Y_1$ is obtained in a form of following equation by multiple correlation analysis past experience data.

$$Y_1 = K_1(5.71W - 0.54X + 50.24) \qquad (2)$$

where $K_1$ : compensation coefficient
W : amount of calcine in t/hour
X : concentration of sulfuric acid in spent electrolyte in kg/$m^3$.

The compensation coefficient $K_1$ is the value required to compensate the pH value so that it is as close to a predetermined setting as possible. Practically, this compensation coefficient $K_1$ is determined depending on the factors including the grain size and the grade of calcine and is commonly selected to be $K_1 \approx 1.0$. The amount W of the calcine is detected by the constant feeding weigher 1 and an analog signal representative of W is applied to the computer 18 after analog-digital conversion. A signal representative of the sulfuric acid concentration X is applied previously to the computer 18 from an operator console 22 connected to the computer 18.

The amount $Y_2$ of the spent electrolyte required for compensating for the deviation of the pH value is given in a form of the following equation.

$$Y_2 = \Delta pH \cdot K_2 \qquad (3)$$

where
$\Delta pH$ : deviation of pH value, that is, difference between detected pH value and pH setting
$K_2$ : amount of spent electrolyte in $m^3$/hour described below.

The pH value of the slurry is detected automatically and continuously by the pH meter 17, and an analog signal representative of the detected pH value is applied to the computer 18 after analog-digital conversion. In the pH meter 17, pH measurement and electrode washing are repeated as previously described, and thus, the detected pH value is held while the washing treatment is being carried out. A signal representative of the pH setting previously to the computer 18 from the operator console 22.

The amount $K_2$ of the spent electrolyte is given by $$K_2 = K_3 \cdot Y_1 \qquad (4)$$

where $K_3$ is a compensating coefficient to determine the additional amount $Y_1$ of the spent electrolyte required for compensation. This coefficient $K_3$ is determined taking into account the response characteristic including hunting of the pH control system, and is commonly selected to be $K_3 \approx 0.5 - 1.0$. The computer 18 computes these numerical values on the basis of the equations above describd so as to suitably change the pH setting of the controller 19 at intervals of 30 seconds.

Two examples of the pH control according to the present invention will now be described to compare the results thereof with similar results of prior art pH control.

EXAMPLE 1

Figure 5:
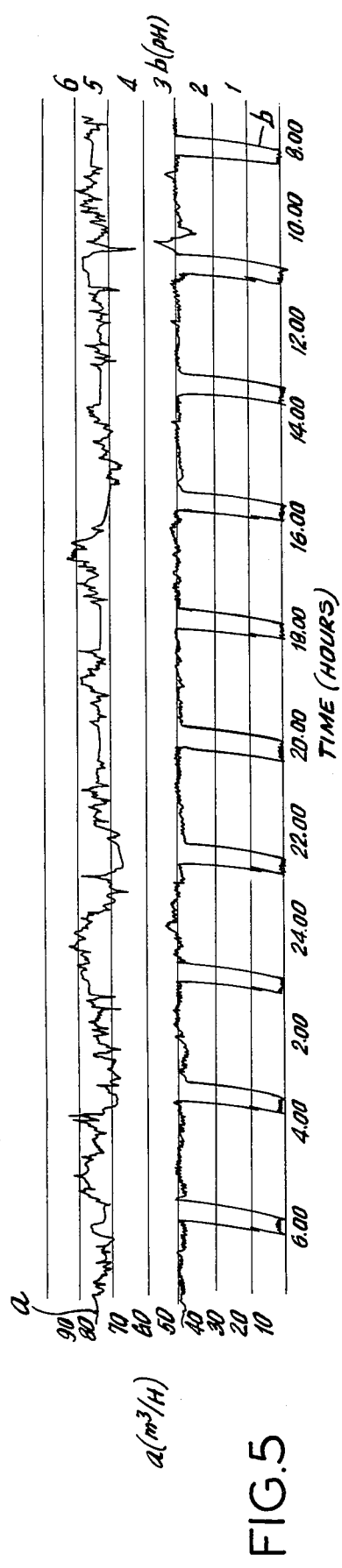
FIGS. 5 and 6 are graphs showing the marked effect of pH control according to the present invention.

Zinc calcine (Zn : 57.7%, Fe : 10.7%, Cd : 0.39%, Pb : 1.22% by weight, grain size 200 mesh under 50%) is continuously fed from the constant feeding weigher to the repulper at a constant feed rate of 14.5 tons/hour, and the acidic leaching solution overflowing from the thickener of the acid leaching section is also supplied to the repulper at a flow rate of 75 $m^3$/hour proportional to the feed rate of the calcine. The calcine and the overflow from the acid thickener are thoroughly mixed together in the repulper to provide a mixture in the form of pulp, (pulp density 150–200 g/l). This pulp is transferred to the classifier. The oversize classified by the classifier having screens (60 Taylor mesh) is fed into the ball mill to be subject to grinding to be collected again in the classifier, while the slurry is fed from the classifier into the storage tank. After being thoroughly agitated in the storage tank, the slurry is fed by the pump into the first neutral leaching tank to which the spent electrolyte is also supplied to accelerate the leaching reaction. Signals representative of a predetermind pH setting of 3.1 and a predetermined sulfuric acid concentration of 154 grams per liter of the spent electrolyte are previously applied from the operator console to the computer. Further, the values of the compensation coefficients $K_1$ and $K_3$ in the equations (2) and (4) are set at $K_1 = 1.0$ and $K_3 = 0.8$ respectively, and on the basis of these equations, the flow rate of the spent electrolyte is controlled so as to control the pH value of the slurry to the predetermined setting of 3.1. The results are shown in FIG. 5. It will be apparent from the graph that the pH value of the slurry can be substantially maintained constant at the setting of 3.1, and this pH value is substantially free from appreciable variations compared with that controlled by the manual control. The result of the pH control is shown in FIG. 5. The a means amount of spent electrolyte, and b means the pH value of the slurry in FIG. 5. Thus, the present invention ensures stable pH control.

EXAMPLE 2

Figure 6:
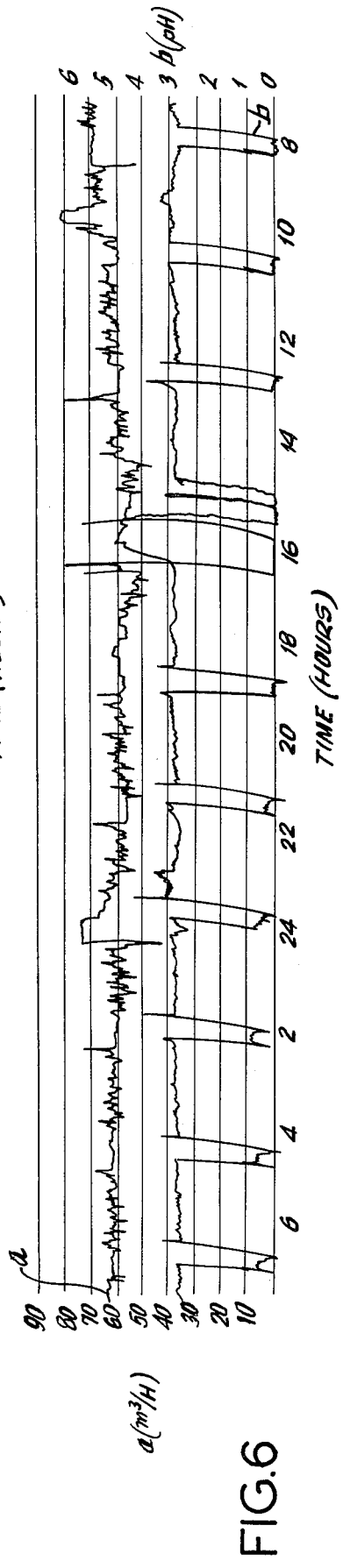

Zinc calcine (Zn : 59%, Fe : 10%, Cd : 0.25%, Pb : 1.2% grain size 200 mesh under 50%) is continuously fed from the constant feeding weigher to the repulper at a constant feed rate of 20 tons/hour, and the acidic leaching solution overflowing from the acid thickener is also supplied to the repulper at a flow rate of 80 m$^3$/hour proportional to the feed rate of the calcine. The calcine and the overflow from the acid thickener are thoroughly mixed together in the repulper to provide a mixture in the form of pulp. This pulp is transferred to the classifier having screens, (60 Taylor mesh). The oversize classified by the classifier is fed into the ball mill to be subject to grinding to be collected again in the classifier, while the slurry is fed from the classifier into the storage tank. After being thoroughly agitated in the storage tank, the slurry is fed by the pump into the first neutral leaching tank to which the spent electrolyte is also supplied to accelerate the leaching reaction. Signals representative of a predetermined pH setting of 3.1 and a predetermined sulfuric acid concentration of 154 grams per liter of the spent electrolyte are previously applied from the operator console to the computer. Further, the values of the compensation coefficients $K_1$ and $K_3$ in the equations (2) and (4) are set at $K_1 = 1.0$ and $K_3 = 0.8$ respectively, and on the basis of these equations, the flow rate of the spent electrolyte is controlled so as to control the pH value of the slurry to the predetermined setting of 3.1. The results are shown in FIG. 5. It will be apparent from the graph that the pH value of the slurry can be substantially maintained constant at the setting of 3.1, and this pH value is substantially free from appreciable variations compared with that controlled by the manual control. Thus, the present invention ensures stable pH control. The result of the pH control is shown in FIG. 6. The a means a mount of spent electrolyte, and b means the value of the slurry in FIG. 6. The period of time between 14 hours and 18 hours is maintenance time.

COMPARATIVE EXAMPLE

A certain quantity of zinc calcine is fed to the repulper and a certain quantity of the overflow from the thickener of the acid leaching section is also supplied to the repulper to obtain the slurry and to control the pH value of the slurry to the setting of 3.5.

The mixture in the form of pulp is tranferred into a classifier and classified slurry and oversize. The slurry is fed into a first neutral leaching tank via storage tank, and a certain quantity of the spent electrolyte is also supplied manually to this first tank in response to measurement of the pH value of the slurry after being mixed with the spent electrolyte with pH paper, so as to adjust the pH value of the slurry.

Figure 7:
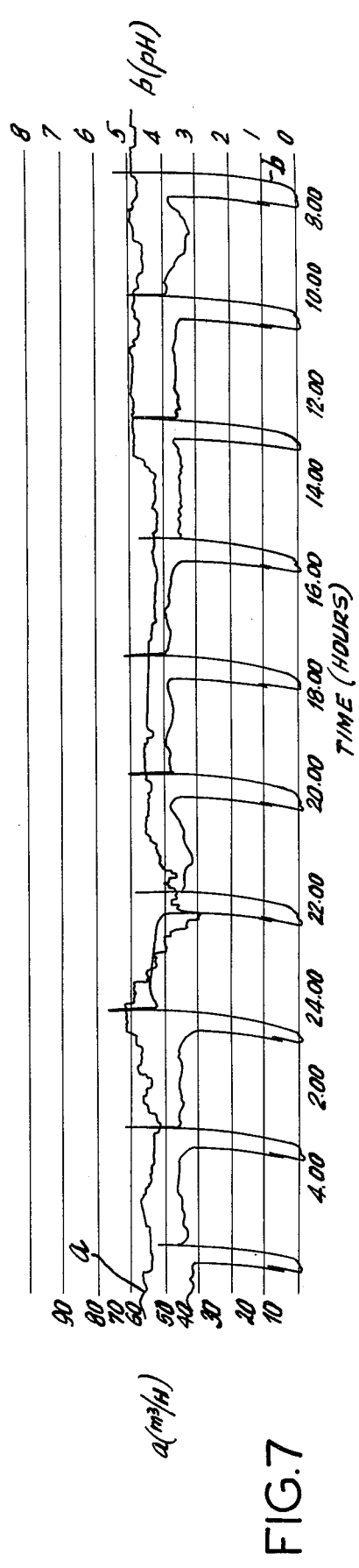
FIG. 7 is a graph showing the effect of pH control according to prior art manual control.

But the pH value of the slurry varies greatly within the range of about 3.0 to 5.0 as in FIG. 7 and thus the pH value of the slurry is not controlled at predetermined setting. The a means a mount of spent electrolytic, and b means the pH value of the slurry in FIG. 7.

We claim:

1. In an automatic leaching system for the hydrometallurgical production of zinc comprising a neutral leaching section and an acidic leaching section for leaching zinc calcine, the latter producing an overflow acidic leaching solution which is mixed with the calcine to obtain a slurry, the improvement which comprises a feed-forward circuit comprising means for detecting the feed rate of the calcine supplied to said neutral leaching section, means for detecting the flow rate of a spent electrolyte supplied to said neutral leaching section, an electronic computer connected to said feed rate detecting means and said flow rate detecting means to make necessary computation in response to the application of the signals representative of the detected feed rate and flow rate from said detecting means thereby generating a control signal, control means connected to said computer to generate an instruction signal in response to the application of said control signal from said computer, and flow controlling valve means for regulating the flow rate of the spent electrolyte in response to the application of said instruction signal from said control means, and a feedback control circuit consisting of a pH meter for continuously detecting the pH value of the slurry after being mixed with the spent electrolyte, said computer, said control means aand said flow controlling valve means controlling the flow rate of the spent electrolyte mixed with the slurry to automatically maintain the pH value of the slurry at a predetermined constant setting, said pH meter being provided with means for automatically washing the electrodes thereof, said automatic washing means comprising a rotatable supporting member, a fluid cylinder supported by said supporting member and having a vertically movable piston rod carrying said electrodes at the lower end thereof, a plurality of tanks including at least a measuring tank provided with an agitator, a first water washing tank, a chemical washing tank and a second water washing tank disposed in the above order beneath the moving path of said electrodes of said pH meter upon the vertical actuation of said piston rod and rotation of said supporting member, so that said electrodes of said pH meter are immersed first in said measuring tank, then successively in said first water washing tank, said chemical washing tank and said second water washing tank to be washed under agitation, and subsequently returned to said measuring tank.

2. An automatic leaching system as claimed in claim 1, wherein said pH meter is disposed in the flowing path of a slurry between a first neutral leaching tank and a second neutral leaching tank in said neutral leaching section, and said chemical washing tank contains therein chemicals comprising hydrochloric acid and hydrochloric-hydroxyl-amine, the concentration of the hydrochloric-hydroxyl-amine being about 190 – 240 g/l.

3. An automatic leaching system as claimed in claim 1, further comprising feeder means for feeding the zinc calcine continuously at a constant rate and serving as a weight detecting means for applying to said computer a signal representative of the detected weight of the calcine, second flow rate detecting means for detecting the flow rate of said overflow acidic solution and generating a signal representative of the flow rate of said solution, second control means for generating an instruction signal in response to the application of said weight signal and said flow rate signal, and second flow controlling valve means for regulating the flow rate of said overflow in response to the application of said instruction signal from said second control means, said second control means, said second flow rate detecting means and said flow controlling valve means constituting a ratio control circuit for preselectively controlling the pH value of the slurry.

* * * * *